United States Patent
de Queiroz

(10) Patent No.: US 7,106,901 B2
(45) Date of Patent: Sep. 12, 2006

(54) METHOD AND APPARATUS FOR IMAGE CLASSIFICATION

(75) Inventor: Ricardo L. de Queiroz, Brasilia (BR)

(73) Assignee: Xerox Corporation, Stamford, CT (US)

( * ) Notice: Subject to any disclaimer, the term of this patent is extended or adjusted under 35 U.S.C. 154(b) by 781 days.

(21) Appl. No.: 10/345,004

(22) Filed: Jan. 15, 2003

(65) Prior Publication Data

US 2005/0100223 A1 May 12, 2005

(51) Int. Cl.
*G06K 9/34* (2006.01)
*G06K 9/62* (2006.01)
*G06K 9/38* (2006.01)
*H04N 1/36* (2006.01)

(52) U.S. Cl. .................. 382/176; 382/253; 382/224; 358/420

(58) Field of Classification Search ................ 382/176, 382/224, 253; 358/420
See application file for complete search history.

(56) References Cited

U.S. PATENT DOCUMENTS

| | | | | |
|---|---|---|---|---|
| 5,602,589 A | * | 2/1997 | Vishwanath et al. ... | 375/240.11 |
| 5,805,228 A | * | 9/1998 | Proctor et al. ......... | 375/240.22 |
| 5,949,555 A | * | 9/1999 | Sakai et al. ................. | 358/462 |
| 6,205,256 B1 | * | 3/2001 | Chaddha ..................... | 382/253 |
| 6,404,923 B1 | * | 6/2002 | Chaddha ..................... | 382/224 |
| 6,470,052 B1 | | 10/2002 | Nguyen et al. ......... | 375/240.22 |

OTHER PUBLICATIONS

Hui Chang and Charles A. Bouman, "Trainable Context Model for Multiscale Segmentation", *IEEE*, 1998.
Anuradha Aiyere and Robert M. Gray, "A Fast, Table-Lookup Algorithm for Classifying Document Images".
ICIP-94, vol. III of III, *IEEE*, pp. 275-279, 1994.

* cited by examiner

*Primary Examiner*—Bhavesh M. Mehta
*Assistant Examiner*—Utpal Shah
(74) *Attorney, Agent, or Firm*—Fay, Sharpe, Fagan, Minnich & McKee, LLP

(57) ABSTRACT

This invention relates to a method and apparatus for image classification. More particularly, the present invention provides a technique to classify an image as a picture, a graphic or a mixed mode image. The classification is based on an approximation of a segmentation. The approximation is HVQ-LUT-based and outputs classification maps indicating whether pixels are background, text or pictures. Said classification maps are filtered to eliminate odd isolated samples and the resulting count of picture, text and background pixel is analyzed before concluding whether the image has pictorial, graphical or mixed contents.

30 Claims, 6 Drawing Sheets

METHOD AND APPARATUS FOR IMAGE CLASSIFICATION

BACKGROUND

This invention relates to a method and apparatus for image classification. More particularly, the present invention provides a technique to classify an image as a picture, a graphic or a mixed mode image. The classification is based on data accumulated as a result of an approximation of a segmentation process. In this regard, the approximation is HVQ-LUT-based and outputs classification maps indicating whether pixels are background, text or pictures. Said classification maps are optionally filtered to eliminate odd isolated samples and the resulting count of picture, text and background pixel is analyzed before concluding whether the image has pictorial, graphical or mixed contents.

While the invention is particularly directed to the art of image segmentation and classification, and will be thus described with specific reference thereto, it will be appreciated that the invention may have usefulness in other fields and applications. For example, the invention may be used in any environment where it would be useful to clarify an image as a particular type.

By way of background, one technique utilized most typically in image processing operations is known as vector quantization (VQ). In VQ, a block of X×Y pixels is mapped to a single "codeword" which is defined using a smaller number of bits than the number required by the original block. Codewords are stored in transmitting, receiving and storage devices, and each codeword is associated with a pre-defined set of image data. The codeword to which each pixel block is mapped, is that codeword which is associated with image data that most closely matches the image data in the pixel block. The typical process includes mapping the pixel block to a codeword, storing the codeword or transmitting it to a receiving device, and then mapping the codeword back to image data when it is retrieved from storage or received at the receiving device. Since codebook storage and codeword transmission require less space and time than storage and transmission of original image data, this process greatly reduces the resources required to reproduce the original image data.

There are typically many more combinations of pixel blocks than there are available codewords, and as indicated by the term "quantization", several input blocks will be mapped to the same single given codeword. For a fixed number of codewords, increasing the size of the pixel block reduces the quality of mapping and reconstruction since a lot more of the actual image data must be mapped to the same number of codewords. Some drawbacks of VQ are that codebook design is often very complex, and that large amounts of time are usually required to search through the codebook and to match blocks to the appropriate codeword. While codebook design can be performed off-line, the block matching searches must be performed on-line.

In hierarchical vector quantization (HVQ), block matching searches are performed two samples at a time. Thus, look up tables (LUTs) can be used directly to perform HVQ in two or more stages. HVQ is described in U.S. Pat. No. 5,602,589, U.S. Pat. No. 6,470,052 B1 and Vishwanath and Chou, "An Efficient Algorithm for Hierarchical Compression of Video," Proc. ICIP-94, pages 275–279 (Nov. 13–16, 1994, all of which are incorporated herein by reference. Briefly, referring to FIG. 6, in the first stage of HVQ, two image pixels are mapped to one codeword, reducing the number of samples by a factor of 2. As shown, the number of samples is reduced form eight (8) to four (4) in stage 1. In the next stage (stage 2), the process is repeated to map pairs of codewords into single codewords. Preferably, codewords are grouped in a direction perpendicular to the direction used for the previous level. As the process continues (e.g. on to stage 3), the resulting codewords are mapped to larger and larger amounts of data.

HVQ allows for a rough approximation of the content of each image block by using simple look-up table operations. The final codeword represents a block approximation and can therefore be directly mapped to other quantities which describe certain characteristics of the approximated block, such as block activity. HVQ codebook design methods follow standard VQ codebook design algorithms and are usually performed by designing the codebooks for a single stage at a time.

In Anuradha Aiyer and Robert M. Gray ("Aiyer and Gray"), *A Fast, Table-lookup for Classifying Document Images*, Proc. of ICIP, Kobe, Japan, 25 PP4.10 (1999), which is incorporated herein by reference, a method to use HVQ to mimic the segmentation of an image is proposed. In this method, the HVQ output is correlated with the output of a segmentation process to assist in classifying portions of an image as picture, background, or text.

Further, in Hui Cheng and Charles A. Bouman ("Cheng and Bouman"), *Trainable Context Model for Multiscale Segmentation*, Proc. of IC IP, Chicago, Ill., pp. 610–614 (1998), which is incorporated herein by reference, a segmentation method to classify image regions as text, background or picture regions is disclosed. Classification is performed through Bayesian training allied with some multiresolution analysis. It performs segmentation and classifies image pixels as BACKGROUND (B), TEXT (T) or PICTURE (P).

Briefly, the Cheng and Bouman segmenter ("CBS") works by using binary classification trees to model the transition probabilities between segmentations at adjacent scales. The classification trees can be efficiently trained to model essential aspects of contextual behavior. In addition, the data model in the approach can incorporate the correlation among the wavelet feature vectors across scales.

The present invention contemplates a new and improved technique for image classification that allows for an efficient classification of an input image.

SUMMARY

A method and apparatus for image classification are provided.

In one aspect of the invention, an image classification method comprises the steps of implementing hierarchical vector quantization on at least one test image to obtain a first data set comprising quantization values for each pixel of the test images, classifying regions of the at least one test image to obtain a second data set comprising classification values indicating whether each pixel of the at least one test image is one of a text, background and picture pixel, correlating the first data set and the second data set to obtain a correlated data set, implementing hierarchical vector quantization on a subsequent input image to obtain a quantization value for each pixel of the input image, classifying the each pixel of the input image as one of text, background and picture based on the corresponding quantization value and the correlated data set, calculating for the input image a number of text pixels, background pixels and picture pixels, respectively, and, determining whether the input image is one of a picture, a graphic, or a mix of image types based on the calculating.

In another aspect of the invention, the method is achieved using a system comprising a classification module, a calculation module and a determination module.

Further scope of the applicability of the present invention will become apparent from the detailed description provided below. It should be understood, however, that the detailed description and specific examples, while indicating preferred embodiments of the invention, are given by way of illustration only, since various changes and modifications within the spirit and scope of the invention will become apparent to those skilled in the art.

DESCRIPTION OF THE DRAWINGS

The present invention exists in the construction, arrangement, and combination of the various parts of the device, and steps of the method, whereby the objectives contemplated are attained as hereinafter more fully set forth, specifically pointed out in the claims, and illustrated in the accompanying drawings in which:

DETAILED DESCRIPTION

In accord with a preferred form of the subject development, an improved classifier is provided that uses an HVQ process and a correlated data set—that is generated by correlating HVQ output with Cheng and Bouman segmenter (CBS) output during training—to determine whether an input image is predominantly graphics, a picture, background or mixed. The invention provides an efficient and relatively quick classification of an image so that the image can then be further processed as desired.

Figure 1:
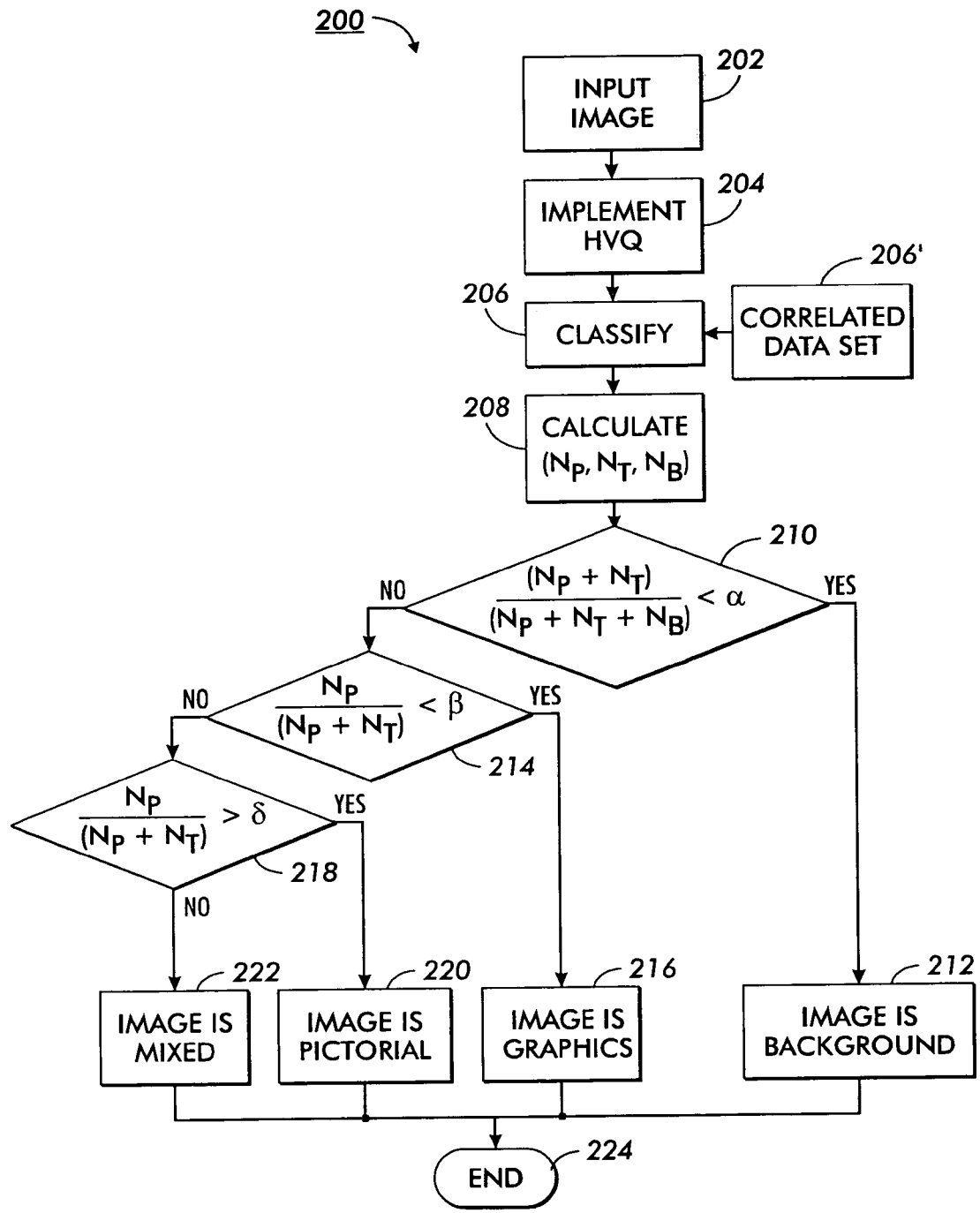
FIG. 1 is a flow chart illustrating a method according to the present invention.

Referring now to the drawings wherein the showings are for purposes of illustrating the preferred embodiments of the invention only and not for purposes of limiting same, FIG. 1 provides a view of an overall method according to the present invention. More particularly, a method 200 is initiated upon the input of an image (step 202). A hierarchical vector quantization (HVQ) is then performed on the image (step 204) by an HVQ module to obtain a quantization value for each block and, thus, each pixel. A preferred HVQ process is a look-up table HVQ process conducted as described above and in U.S. Pat. No. 5,602,589 and Vishwanath and Chou, "An Efficient Algorithm for Hierarchical Compression of Video," Proc. ICIP-94, pages 275–279 (Nov. 13–16, 1994), both of which are incorporated herein by reference. Of course, any suitable HVQ process, or other similar process, would suffice so long as values for each block and, thus, each pixel are output.

Each pixel of the input image is then classified (step 206) as one of text (T), background (B) or picture (P) based on the quantization value obtained in the step 204 and a correlated data set 206' (step 206). It is to be appreciated the correlated data set is generated by a correlator module (to be hereinafter described) during training of the system, which training will be described in connection with FIG. 2. Briefly, however, the correlated data set allows for a quick table look-up using the quantization value output by the HVQ process to determine the nature of the subject pixels, e.g. text, background or picture. That is, the correlated data set is essentially a table that correlates a quantization value with a label of picture (P), background (B), or text (T).

For a preferred embodiment, the output image is then cleaned in the following way. If a pixel (BTP) has no neighbors of the same class, then that classification is replaced by the class to which the majority of neighbors belong. This will remove isolated pixels of a given class. This part of the method is, of course, optional.

After the input image is classified on a per pixel basis, the number of background (Nb), text (Nt), and picture (Np) pixels are calculated (step 208). It is to be appreciated that Nb+Nt+Np equals the total number of pixels in the input image.

Based on the number of pixels calculated, a determination is made as to whether a first criteria is met (step 210). More specifically, in the preferred embodiment, the criteria is whether $(Np+Nt)/(Np+Nb+Nt)<\alpha$, where $\alpha=0.1$. If this criteria is met, the image is determined to be predominately background (step 212). If the first criteria is not met, a determination is made as to whether second criteria is met based on the calculation (step 214). The second criteria is whether $Np/(Np+Nt)<\beta$, where $\beta=0.2$. If so, the image is determined to be a graphics image (step 216). If not, the third criteria is evaluated to determine if the image is pictorial (step 218). The third criteria is whether $Np/(Np+Nt)>\delta$, where $\delta=0.8$. If the criteria is met, the image is determined to be pictorial (step 220). If not, the image is determined to be "mixed" (step 222). Upon the determination at any point as to whether the image is background, graphics, pictorial, or mixed, the method is ended (step 224).

It should be appreciated that the noted values for $\alpha$, $\beta$ and $\delta$ are only examples of values that meet the objectives of the invention. Those of skill in the art will understand that other values (or ranges) will suffice depending on the systems used, design criteria of the designer, etc.

Figure 2:
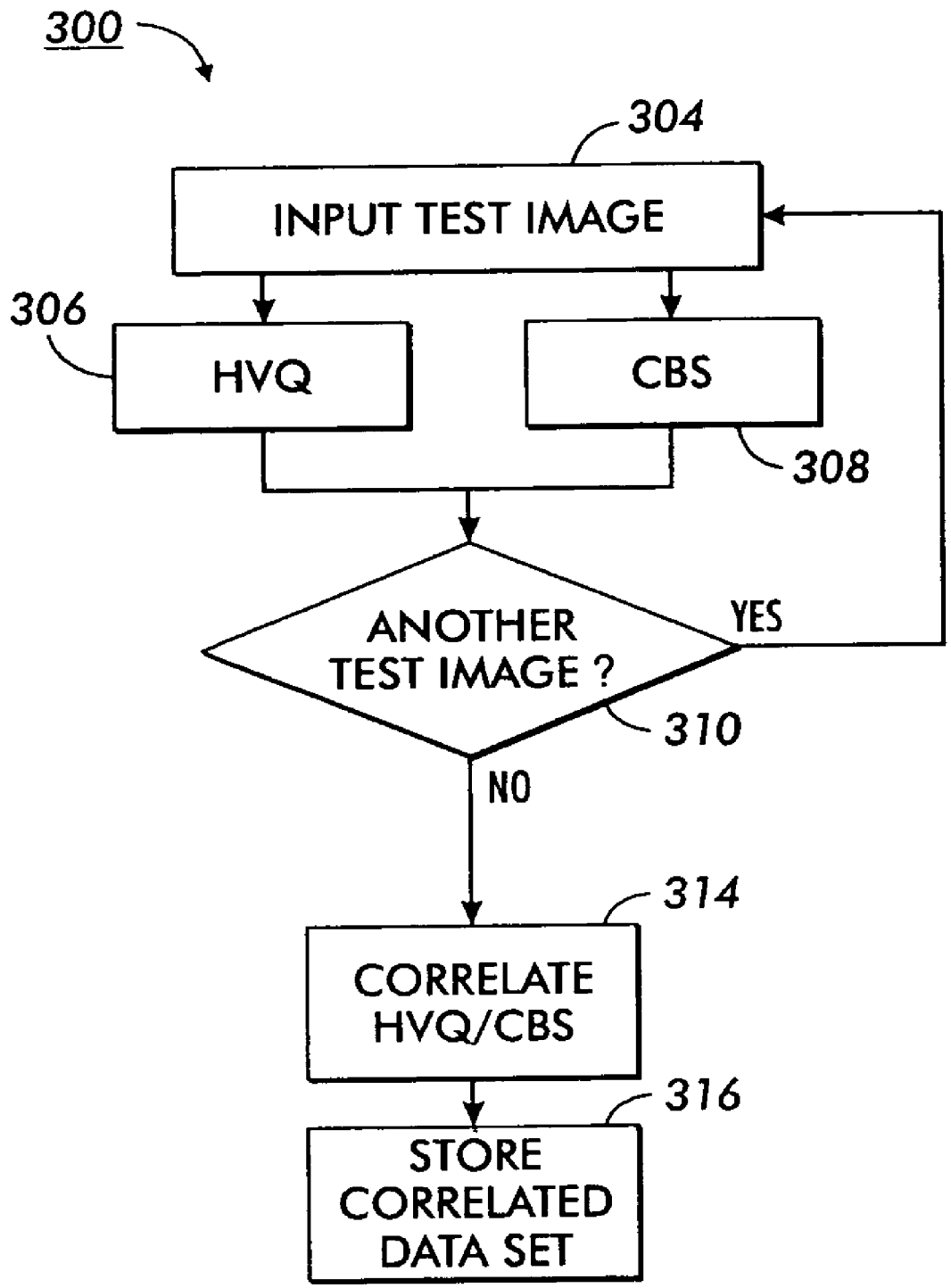
FIG. 2 is a flow chart illustrating a training method according to the present invention.

As noted above, the classification method and system require training in order to generate the correlated data set by the above-referenced and later described correlator module. Referring now to FIG. 2, a training method 300 is shown. Initially, a first test image is input to the system (step 304). In the preferred embodiment, hierarchical vector quantization and a CBS classification are applied to the input image (steps 306, 308). Of course, the data values generated by each of these processes is stored in an appropriate manner and location in the system. So, for each pixel, an HVQ value is generated as well as a classification value (e.g. B, P, or T) based on the CBS. A determination is then made as to whether another test image should be input (step 310). If so, steps 304–310 are repeated. If not, the values generated in steps 306 and 308 are correlated and stored (steps 314, 316).

More particularly, with respect to training, the typical output of a CBS process is an image which is 4×4 times smaller than the original. Pixels are color coded to represent each of the B, T, or P classes. By using 4 layers of HVQ, each 4×4 block in the image is mapped to a codeword, which can be mapped to a representative 4×4 pixel block, which approximates the input image block.

The HVQ segmenter is trained by correlation between the HVQ module output and the CBS module output. For every block of the test images, the HVQ quantization values (or codeword index) are recorded. This information and the CBS class determination (e.g. B, P, or T) for those blocks are output as a pair. After all blocks are computed and results recorded, the HVQ quantization values are correlated to the CBS class determinations. This is accomplished by pairing each of the quantization values with a CBS class determination (B, P, or T) which represents the majority of occurrences of a class (during training) for a given HVQ value. Hence, for subsequent input images, the correlated data set maps the HVQ output to a class (B, P, or T) that the CBS might output if it were used to analyze the same block. That is, for all quantization values (or ranges), a label of B, P or T is determined based on the processing of the pixels of the test image(s). As a result, using only HVQ-LUTs, a "segmentation" that approximates the CBS performance can be performed on subsequent images. Thus, a method according to the present invention (using the correlated data set contemplated herein, such as described in connection with FIG. 1) may be implemented on subsequent images.

Overall, the method allows for VERY fast image classification. For scanned data, it is more difficult to find purely graphics images because of the softening of the edges. In general, the large margin in favor of the "mixed" mode is an advantage since assigning a mixed class to a graphics or pictorial image is not a misclassification in a strict sense.

Figure 3:
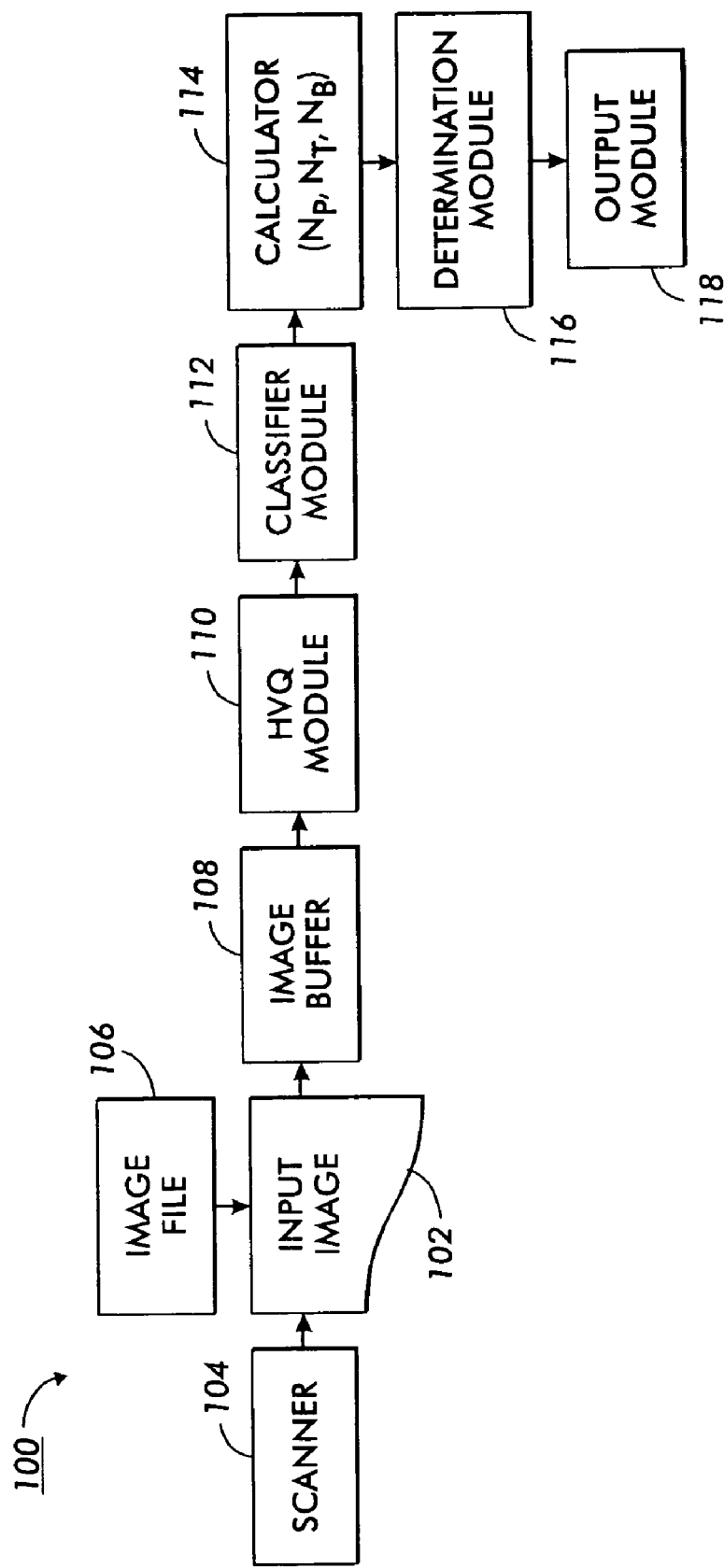
FIG. 3 is a functional block diagram of a system according to the present invention.

Referring now to FIG. 3, a system according to the present invention that is capable of carrying out the method of FIG. 1 is illustrated. As shown, the system 100 accepts an input image 102. The input image 102 may be generated in a variety of ways. For example, the input image may originate in a scanner 104 which provides a suitable digital input image as output. Alternatively, the input digital image may simply be provided by an image file 106 which is part of a word processor or image rendering network. With this in mind, it should be appreciated that the present invention has application in all types of printing and image rendering environments. That is, may be applied in printers, copiers, fax machines, etc. Moreover, the invention may be suitably implemented in xerographic printing applications.

Referring back to FIG. 3, in a preferred form, the input image 102 is provided to an image buffer 108. Image buffer 108 is connected to a hierarchical vector quantization (HVQ) module 110. Preferably, the HVQ module 110 takes the form of a look-up table HVQ module, or HVQ-LUT. However, the invention is not so limited. In any case, the HVQ module is suited for performing the HVQ, according to step 204 of FIG. 1.

Classifier module 112 is also provided. Of course, this module performs the classification of the pixels of the image as background (B), text (T), or picture (P) based on the correlated data set (steps 206, 206' of FIG. 1). The output of the classifier module 112 is provided to a calculator 114. The calculator module 114 performs calculations to determine the number of background pixels (Nb), the number of text pixel (Nt) and the number of picture pixels (Np) in the input image, as described in connection with step 208 of FIG. 1. The calculator, in turn, provides this information to a determination module 116. The determination module 118 then makes determinations based on predetermined criteria as described in connection with steps 210 through 222 of FIG. 1. The output of the determination module 116 is connected to an output module 118 that has a capability of providing the output to a variety of systems. The output is the final determination as to whether the input image is predominantly background, graphics, pictorial, or mixed. For example, an output that the image is primarily graphics may be provided to a printer or other image-rendering device. Alternatively, the output may be provided to another image processing module, e.g., a segmenter. This output will assist in making any subsequent processing or manipulation of the input image more efficient.

As noted above, the techniques of the present invention also require training of the system. In this regard, referring to FIG. 4, a training system 150 to carry out the training of FIG. 2 is shown. In the system, an input test image 152 is provided. As above, this image may be generated in a variety of ways. For example, the input test image may originate in a scanner 154, which provides a suitable digital input image as output, or may simply be provided by an image file 156, which may be part of a word processor or image rendering network. Again, it should be appreciated that the present invention has application in all types of printing and image rendering environments. It may be applied on printers, copiers, fax machines, xerographic printing applications, . . . etc.

The input test image is provided to an image buffer 158. The image buffer 158 is connected to a hierarchical vector quantization (HVQ) module 160 and a classifier module 162. As such, HVQ is performed on the test image (such as in step 306 of FIG. 2) as well as a CBS process (such as in step 308 of FIG. 2). Preferably, the HVQ module takes the form of a look-up table HVQ module, or HVQ-LUT, and the classifier module 162 takes the form of a CBS classifier. However, the invention is not so limited. For example, any type of classifier that provides a picture, background and text label, or the like, to pixels (or pixel values) would be a suitable complement to the HVQ module. Likewise, the HVQ modules may be replaced by modules performing similar tasks, e.g. outputting values for each block and, thus, each pixel.

A correlator module 164 is operatively connected to both the HVQ module 160 and the classifier module 162. Correlator module 164 correlates the values obtained by the HVQ module with the labels generated by the classifier 162 and ultimately provides correlation data, or a correlated data set, that is necessary in order to effectively implement the preferred system. In this way, the correlator module 164 provides data to the classifier module 112 (FIG. 3). It should be recognized that the correlation data, or correlated data set, may be stored in the correlator, in the classifier module, or in some other convenient location within the system.

Figure 4:
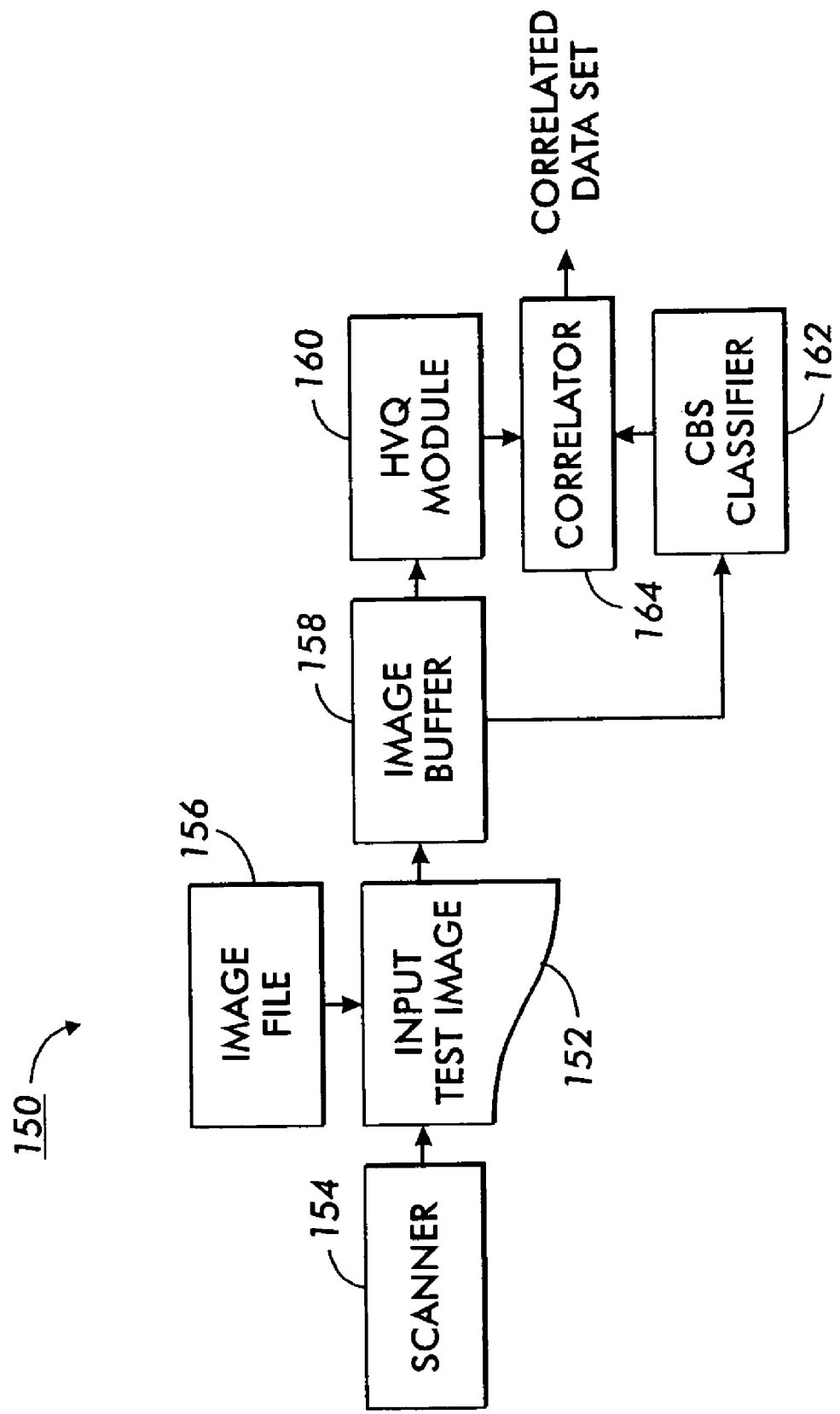
FIG. 4 is a functional block diagram of a system according to the present invention.

As it will be appreciated by those skilled in the art, the above-referenced systems described in connection with FIGS. 3 and 4 may be implemented as subsystems within the same system, or as separate and distinct systems. The link between the two systems, or subsystems, is the correlated data set.

Figure 5:
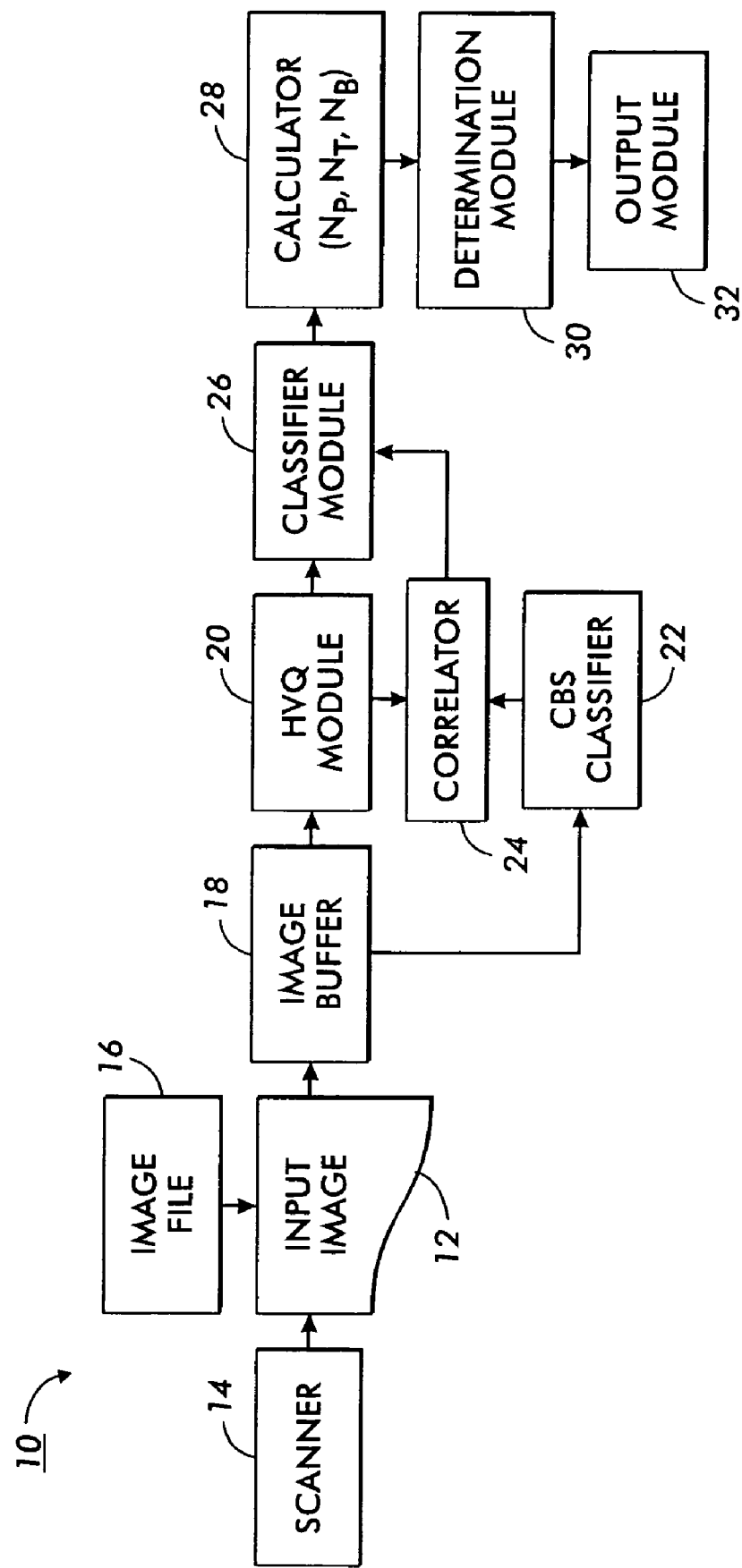
FIG. 5 is a functional block diagram of a system according to the present invention; and, FIG. 6 is a diagram illustrating HVQ.
Figure 6:
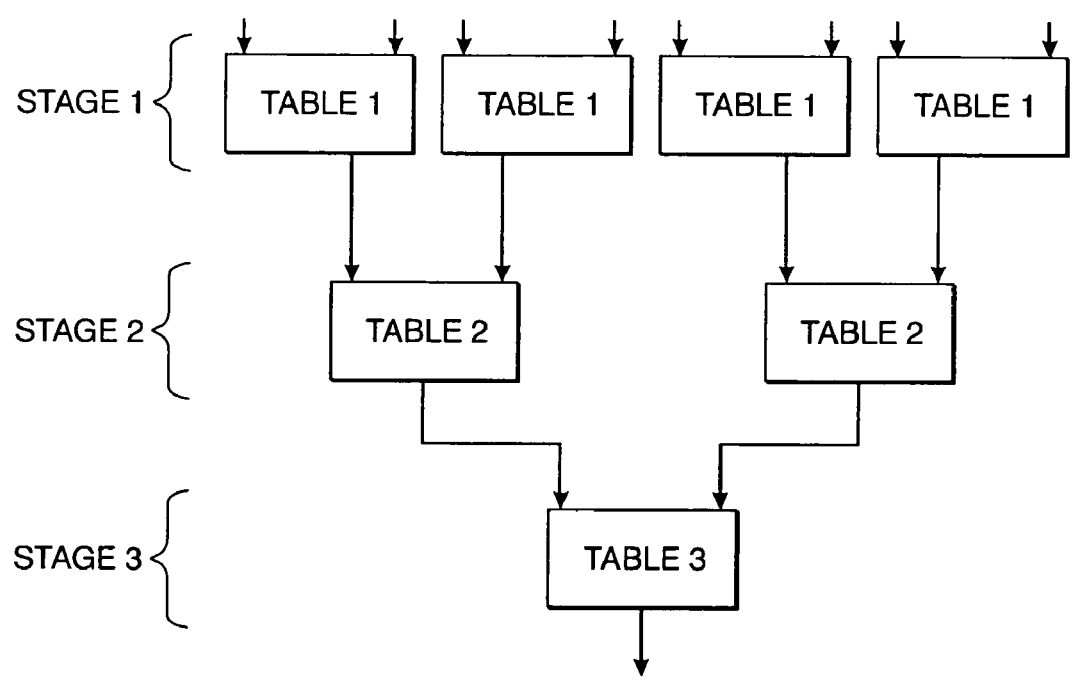

Alternatively, the system may be provided in one integrated system, such as that shown in FIG. 5. The functions of the modules of FIG. 5 simply reflect the functions described above in connection with corresponding modules of FIGS. 3 and 4. Nonetheless, as shown, the system 10 accepts an input image 12. The input image 12 can be generated in a variety of ways. For example, the input image may originate in a scanner 14 which provides a suitable digital input image as output. Alternatively, the input digital image may simply be provided by an image file 16 which is a part of a word processor or image rendering network. Again, it should be appreciated that the present invention has application in all types of printing and image rendering environments, e.g. printers, copiers, fax machines, . . . etc. Moreover, the invention may be suitably implemented in xerographic printing applications.

Referring back to FIG. 5, in a preferred embodiment, the input image 12 is provided to an image buffer 18. Image buffer 18 is connected to a hierarchical vector quantization (HVQ) module 20 and a classifier module 22. As above, the HVQ module 20 preferably takes the form of a look-up table HVQ module, or HVQ-LUT, and the classifier module 22 takes the form of a CBS classifier. However, the invention is not so limited. For example, any type of classifier that provides a picture, background and text label, or the like, to pixels (or pixel values) would be a suitable complement to the HVQ module. Likewise, the HVQ modules may be replaced by modules performing similar tasks.

A correlator module 24 is operatively connected to both the HVQ module 20 and the classifier module 22. This module provides input to a classifier module 26. The output of the classifier module 26 is provided to a calculator 28 which, in turn, provides information to a determination module 30. The output of the determination module 30 is connected to an output module 32 which has capability of providing the output to a variety of systems. For example, the output may be provided to a printer or other image rendering device. Alternatively, the output may be provided to another image processing module, e.g. a segmenter.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications, variations, improvements, and substantial equivalents.

Having thus described the invention, I hereby claim:

1. An image classification method comprising steps of:
   implementing hierarchical vector quantization on at least one test image to obtain a first data set comprising quantization values for each pixel of the at least one test image;
   classifying regions of the at least one test image to obtain a second data set comprising classification values indicating whether the each pixel of the test images is one of a text, background and picture pixel;
   correlating the first data set and the second data set to obtain a correlated data set;
   implementing hierarchical vector quantization on a subsequent input image to obtain a quantization value for each pixel of the input image;
   classifying the each pixel of the input image as one of text, background and picture based on a corresponding quantization value and the correlated data set;
   calculating for the input image a number of text pixels, background pixels and picture pixels, respectively;
   determining whether the input image is predominately background based on the calculating and first predetermined criteria;
   determining whether the input image is predominately graphics based on the calculating and second predetermined criteria;
   determining whether the input image is predominately pictorial based on the calculating and third predetermined criteria; and,
   determining that the input image is a mixed image if the first, second and third criteria are not met.

2. The method as set forth in claim 1 wherein the first criteria is:

$$(Np+Nt)/(Np+Nb+Nt)<\alpha$$

where $Np$ is the number of picture pixels, $Nt$ is the number of text pixels and $Nb$ is the number of background pixels, and where $Np+Nb+Nt=$a total number of pixels in the input image.

3. The method as set forth in claim 2 wherein a equals 0.1.

4. The method as set forth in claim 1 wherein the second criteria is:

$$Np/(Np+Nt)<\beta$$

where $Np$ is the number of picture pixels and $Nt$ is the number of text pixels.

5. The method as set forth in claim 4 wherein $\beta$ equals 0.2.

6. The method as set forth in claim 1 wherein the third criteria is:

$$Np/(Np+Nt)>\delta$$

where $Np$ is the number of picture pixels and $Nt$ is the number of text pixels.

7. The method as set forth in claim 6 wherein $\delta$ equals 0.8.

8. An image classification system comprising:
   means for implementing hierarchical vector quantization on at least one test image to obtain a first data set comprising quantization values for each pixel of the at least one test image;
   means for classifying regions of the at least one test image to obtain a second data set comprising classification values indicating whether the each pixel of the test images is one of a text, background and picture pixel;
   means for correlating the first data set and the second data set to obtain a correlated data set;
   means for implementing hierarchical vector quantization on a subsequent input image to obtain a quantization value for each pixel of the input image;
   means for classifying the each pixel of the input image as one of text, background and picture based on a corresponding quantization value and the correlated data set;
   means for calculating for the input image a number of text pixels, background pixels and picture pixels, respectively;
   means for determining whether the input image is predominately background based on the calculating and first predetermined criteria;
   means for determining whether the input image is predominately graphics based on the calculating and second predetermined criteria;
   means for determining whether the input image is predominately pictorial based on the calculating and third predetermined criteria; and,
   means for determining that the input image is a mixed image if the first, second and third criteria are not met.

9. The system as set forth in claim 8 wherein the first criteria is:

$$(Np+Nt)/(Np+Nb+Nt)<\alpha$$

where $Np$ is the number of picture pixels, $Nt$ is the number of text pixels and $Nb$ is the number of background pixels, and where $Np+Nb+Nt=$a total number of pixels in the input image.

10. The system as set forth in claim 9 wherein $\alpha$ equals 0.1.

11. The system as set forth in claim 8 wherein the second criteria is:

$$Np/(Np+Nt)<\beta$$

where $Np$ is the number of picture pixels and $Nt$ is the number of text pixels.

12. The system as set forth in claim 11 wherein β equals 0.2.

13. The system as set forth in claim 8 wherein the third criteria is:

$$Np/(Np+Nt)>\delta$$

where Np is the number of picture pixels and Nt is the number of text pixels.

14. The system as set forth in claim 13 wherein δ equals 0.8.

15. An image classification method comprising steps of:
implementing hierarchical vector quantization on an input image to obtain a quantization value for each pixel of the input image;
classifying the each pixel of the input image as one of text, background and picture based on a corresponding quantization value;
calculating for the input image a number of text pixels, background pixels and picture pixels, respectively;
determining whether the input image is predominately background based on the calculating and first predetermined criteria;
determining whether the input image is predominately graphics based on the calculating and second predetermined criteria;
determining whether the input image is predominately pictorial based on the calculating and third predetermined criteria; and,
determining that the input image is a mixed image if the first, second and third criteria are not met.

16. The method as set forth in claim 15 wherein the first criteria is:

$$(Np+Nt)/(Np+Nb+Nt)<\alpha$$

where Np is the number of picture pixels, Nt is the number of text pixels and Nb is the number of background pixels, and where Np+Nb+Nt=a total number of pixels in the input image.

17. The method as set forth in claim 16 wherein α equals 0.1.

18. The method as set forth in claim 15 wherein the second criteria is:

$$Np/(Np+Nt)<\beta$$

where Np is the number of picture pixels and Nt is the number of text pixels.

19. The method as set forth in claim 18 wherein β equals 0.2.

20. The method as set forth in claim 15 wherein the third criteria is:

$$Np/(Np+Nt)>\delta$$

where Np is the number of picture pixels and Nt is the number of text pixels.

21. The method as set forth in claim 20 wherein δ equals 0.8.

22. An image classification system comprising:
a hierarchical vector quantization module operative to perform hierarchical vector quantization on an input image to obtain a quantization value for each pixel of the input image;
a classification module operative to classify the each pixel of the input image as one of text, background and picture based on a corresponding quantization value;
a calculation module operative to count for the input image a number of text pixels, background pixels and picture pixels, respectively; and,
a determination module operative to determine whether the input image is predominately background based on the calculating and first predetermined criteria, whether the input image is predominately graphics based on the calculating and second predetermined criteria, whether the input image is predominately pictorial based on the calculating and third predetermined criteria and, that the input image is a mixed image if the first, second and third criteria are not met.

23. The system as set forth in claim 22 wherein the first criteria is:

$$(Np+Nt)/(Np+Nb+Nt)<\alpha$$

where Np is the number of picture pixels, Nt is the number of text pixels and Nb is the number of background pixels, and where Np+Nb+Nt=a total number of pixels in the input image.

24. The system as set forth in claim 23 wherein α equals 0.1.

25. The system as set forth in claim 22 wherein the second criteria is:

$$Np/(Np+Nt)<\beta$$

where Np is the number of picture pixels and Nt is the number of text pixels.

26. The system as set forth in claim 25 wherein β equals 0.2.

27. The system as set forth in claim 22 wherein the third criteria is:

$$Np/(Np+Nt)>\delta$$

where Np is the number of picture pixels and Nt is the number of text pixels.

28. The system as set forth in claim 27 wherein δ equals 0.8.

29. The system as set forth in claim 22 further comprising a second classification module operative to generate a data set for training the hierarchical vector quantization module.

30. The system as set forth in claim 29 further comprising a correlated data set based on the training.

* * * * *